W. G. McQUISTON.
ANIMAL TRAP.
APPLICATION FILED AUG. 4, 1911.

1,020,950.

Patented Mar. 19, 1912.

Witnesses
H. T. Johnson
Laura S. Inman

Inventor
WILLIAM G. McQUISTON
By Edward R. Inman
Attorney

UNITED STATES PATENT OFFICE.

WILLIAM G. McQUISTON, OF OIL CITY, PENNSYLVANIA, ASSIGNOR OF ONE-HALF TO HIRAM T. ROSE, JR., OF ROUSEVILLE, PENNSYLVANIA.

ANIMAL-TRAP.

1,020,950. Specification of Letters Patent. Patented Mar. 19, 1912.

Application filed August 4, 1911. Serial No. 642,253.

*To all whom it may concern:*

Be it known that I, WILLIAM G. McQUISTON, a citizen of the United States, residing at Oil City, in the county of Venango and State of Pennsylvania, have invented certain new and useful Improvements in Animal-Traps, of which the following is a specification.

The construction and operation of my improved trap are herein fully set forth, reference being had to the accompanying drawings, which form a part hereof and in which:—

Figure 1:
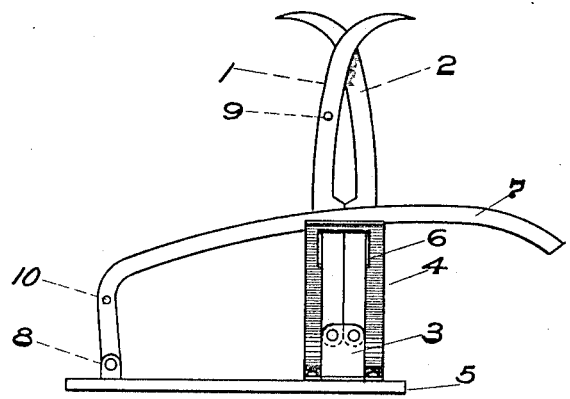
Figure 2:
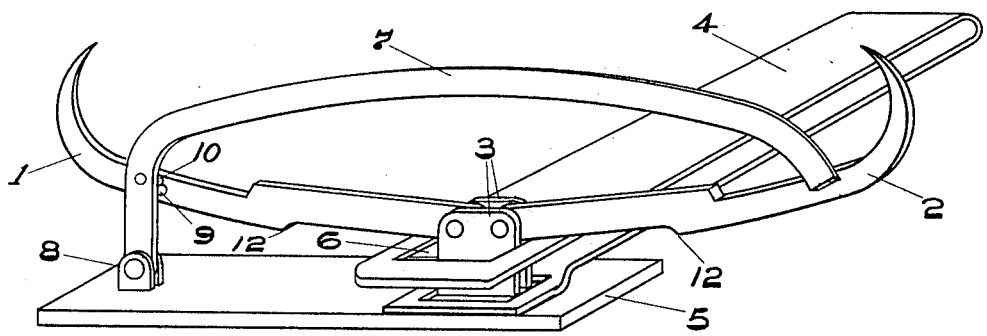
Figure 3:
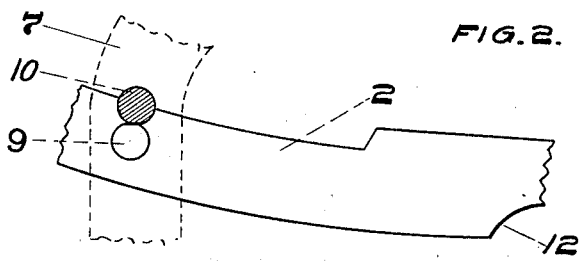

Figure 1 is a front elevation of my improved trap in the normal, closed position. Fig. 2 is a perspective view of same in the set position. Fig. 3 is a detail.

In most respects the drawings show my trap as actually constructed, but in some respects they may be considered as illustrative merely, as, for instance,—all parts may be either stamped from sheet metal, or portions may be cast from suitable foundry metal, as steel or malleable iron, or the base may be constructed of wood and the spring may be attached to the base in any satisfactory manner other than that shown.

My trap is constructed as follows:—Two oppositely-swinging jaws 1 and 2 are hinged at one (the lower) end between lugs or ears 3, so that said jaws may swing vertically toward or away from each other, and occupy the positions shown in Figs. 1 and 2. The outer end of each jaw is curved inwardly for obvious reasons. A spring of a substantially V-shape is secured by one of the ends, in any suitable manner, to the base 5 of the trap; the other end of said spring—which I term the actuating end,— is provided with an opening 6 through which the jaws pass when the trap is sprung or closed in the normal position, as shown in Fig. 1.

When the trap is to be set, the spring 4 is depressed as shown in Fig. 2, the jaws are carried apart so as to occupy a horizontal position and bear upon the upper face of the actuating end of said spring, the tendency of which is, as will be readily understood, to close the jaws and "spring" the trap.

For the purpose of retaining the jaws in the open or set position, I employ a trigger or which may be more aptly termed a set lever 7, one end of which is hinged to base 5 by means of any suitable device or hinge, as 8, said hinge being located upon said base at a point in proximity to the outer end of jaw 1, when said jaw is in the set position.

The hinge end of lever 7 extends vertically for a short distance, then it turns to and extends in a substantially horizontal direction, so that its free end rests in proximity to the outer end of jaw 2.

The detent which holds the trap set, consists of a laterally-extending pin 9, which projects horizontally outward from the side of jaw 1, which pin is arranged to be engaged by a laterally-extending pin 10 carried by lever 7.

The contact or engaging faces of pins 9 and 10 are slightly flattened, as shown in Fig. 3, which is an enlarged view of said pins, and a somewhat exaggerated illustration of said flattened, engaging surfaces. When the horizontal portion of lever 7 is moved either up or down, pin 10 is caused to move laterally, thus causing the disengagement of the pins and permitting the trap to spring.

A shoulder 12 is formed upon the outer edge of each jaw to form a stop for and limit the upward movement of the actuating spring 4, when the trap springs.

My trap is especially adapted to be set in a runway frequented by animals which it is desired to catch, or in the holes of same, where the passing animal is most likely to come in contact with the lever, to spring the trap,—as it is designed to be used without bait. The trap may also be placed upon the top of a pole near a poultry yard that is frequented by predatory birds, for the purpose of catching them. When the trap is sprung, the victim is held firmly between the jaws, the inwardly curved ends effectually preventing an escape upwardly from between them.

The upper end of each jaw is slightly offset so that they may pass and occupy the relative position shown in Fig. 1.

I claim:

An animal trap consisting of a base, a pair of oppositely-swinging jaws each pivoted at one point to said base, one of said jaws being provided adjacent to its free end with a laterally-extending pin, a spring arranged to close said jaws and a set-lever hinged at one end to said base, and provided with a laterally-extending pin arranged to engage said first-mentioned pin for the purpose set forth.

In testimony whereof I affix my signature in presence of two witnesses.

WILLIAM G. McQUISTON.

Witnesses:
H. G. JOHNSON,
E. R. INMAN.

Copies of this patent may be obtained for five cents each, by addressing the "Commissioner of Patents, Washington, D. C."